United States Patent
Monte

(10) Patent No.: US 9,939,585 B1
(45) Date of Patent: Apr. 10, 2018

(54) WAVEGUIDE DEVICE WITH SWITCHABLE POLARIZATION CONFIGURATIONS

(71) Applicant: KVH Industries, Inc., Middletown, RI (US)

(72) Inventor: Thomas D. Monte, Homer Glen, IL (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 15/606,130

(22) Filed: May 26, 2017

(51) Int. Cl.
G02B 6/00 (2006.01)
G02B 6/27 (2006.01)
H01Q 21/24 (2006.01)
G02B 6/10 (2006.01)

(52) U.S. Cl.
CPC ......... *G02B 6/2766* (2013.01); *G02B 6/105* (2013.01); *G02B 6/2726* (2013.01); *H01Q 21/245* (2013.01)

(58) Field of Classification Search
None
See application file for complete search history.

(56) References Cited

U.S. PATENT DOCUMENTS

| | | | |
|---|---|---|---|
| 2,881,398 A | 4/1959 | Jones | |
| 3,215,957 A | 11/1965 | Dantzig | |
| 3,728,644 A | 4/1973 | Chu | |
| 4,606,605 A * | 8/1986 | Ashkin | G02B 6/105 385/11 |
| 6,233,371 B1 * | 5/2001 | Kim | G02B 6/105 372/105 |
| 8,723,747 B2 * | 5/2014 | Rice, I | H01P 1/173 343/756 |
| 8,994,473 B2 | 3/2015 | Naym | |
| 9,142,893 B2 | 9/2015 | Son | |
| 9,203,162 B2 * | 12/2015 | Kyhle | H01P 1/065 |
| 9,444,149 B2 * | 9/2016 | Cha | H01P 1/161 |
| 9,520,637 B2 * | 12/2016 | Monte | H01Q 3/02 |
| 2011/0057849 A1 | 3/2011 | Naym | |
| 2013/0307721 A1 * | 11/2013 | Son | H01Q 3/08 342/352 |
| 2014/0152404 A1 | 6/2014 | Kyhle | |

* cited by examiner

*Primary Examiner* — Rhonda Peace
(74) *Attorney, Agent, or Firm* — Hamilton, Brook, Smith & Reynolds, P.C.

(57) ABSTRACT

A waveguide device comprises a first circular waveguide segment (CWS) that imparts a 3λ/8 relative phase shift to two orthogonal linearly polarized signals, and a second CWS that imparts a λ/8 relative phase shift to two orthogonal linearly polarized signals. A waveguide assembly (WGA) comprises the first CWS disposed coaxially adjacent to the second CWS. A source may provide dual linear polarized energy into the WGA. In a first mode, the first CWS is axially orientated relative to the second CWS, such that the first CWS polarization is offset by 90° degrees with respect to the second CWS polarization. The radiation source polarization may be offset by 45° relative to the first CWS polarization and the second CWS polarization. In a second mode, the first CWS may be orientated with respect to the second CWS, such that the first CWS polarization and the second CWS polarization are substantially the same.

25 Claims, 14 Drawing Sheets

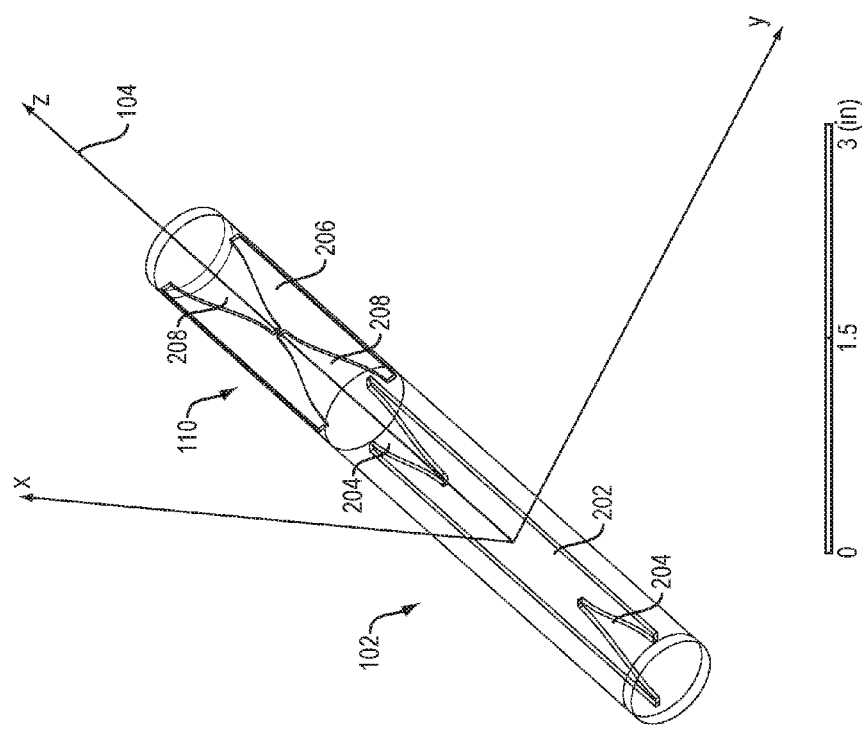

WAVEGUIDE DEVICE WITH SWITCHABLE POLARIZATION CONFIGURATIONS

BACKGROUND

Satellite communication systems convey information, between satellites in earth orbit and terrestrially-based transceiver stations, by propagating electromagnetic energy across a wireless radio link. Important components in any radio link communications systems are antennas. An antenna is a component that converts an electromagnetic wave propagating on a transmission line to an electromagnetic wave propagating in free space (transmission), or an electromagnetic wave propagating in free space to an electromagnetic wave propagating on a transmission line (reception).

Polarization is an important characteristic of propagating electromagnetic waves. Polarization describes the motion through which an electric field vector of an electromagnetic wave points as the electromagnetic wave travels through a point in space. The electric field vector tip can trace a line, circle, or ellipse as the electromagnetic wave passes through the imaginary point in space. In general, these traces are referred to as linear, circular, or elliptical polarization, respectively.

Polarization is important in many applications, and particularly for antennas. The polarization of the antenna is defined by the field orientation of the electromagnetic wave it radiates when the antenna is transmitting. The polarization characteristic of the antenna is important because, for maximum power transfer between radio links, the transmitting and receiving antennas must be of identical matching polarization states at the same time. If the transmitting and receiving antennas are linear polarized, for example, and if the transmitting antenna is horizontally polarized while the receiving antenna is vertically polarized, then no power would be received. Conversely, if both the transmitting and receiving antennas are horizontally or vertically polarized, then maximum power is received. Because antennas facilitate the transition of electromagnetic energy propagating between free space and a transmission link, polarization is also an important characteristic of all antennas.

A particular satellite may be configured to receive and transmit electromagnetic energy having a specific polarization, e.g., either linear polarization (LP), or circular polarization (CP). Because a terrestrially-based transceiver station may be required to communicate with different satellites, the terrestrially-based transceiver station may need to be able to receive and transmit microwave energy having different polarizations.

An advantage of a radio link using circularly polarized microwave energy is that the angular relationship between the transmitting antenna and the receiving antenna is largely irrelevant. For linearly polarized radio links, however, the angular relationship is important because, as described above, the polarization angle of the transmitter must match the polarization angle of the receiver for maximum power transfer.

For stationary, terrestrially-based transceiver stations, the polarization angle that matches the target satellite may be determined based on the terrestrial location of the transceiver station and the position of the satellite. If the location of the terrestrially-based transceiver station changes, or if the terrestrially-based transceiver stations acquires a different satellite, the polarization angle of the transceiver station may need to change to match the satellite polarization. The ability to change the polarization angle is referred to herein as "polarization skew control."

Prior art polarization skew control may involve rotating the entire transceiver, which may be heavy and difficult to mechanically move. Further, the rotation may require flexible cables/waveguide assemblies to accommodate the rotation.

SUMMARY OF THE INVENTION

The described embodiments present a circular waveguide polarization device that can provide polarization skew control by switching between two configurations; dual circular polarization, and dual linear polarization with skew control. Some embodiments use a single stepper motor to facilitate the skew control. The described embodiments may be useful in receive only and VSAT marine antennas. The described embodiments may alternatively be used in other applications, for example, as an antenna with polarization switching configurations between low earth orbit (LEO) satellites with circular polarization, and geosynchronous earth orbit (GEO) satellites with linear polarization.

Another advantage of the described embodiments is that the linear polarization skew is controlled solely by rotation of circular waveguide subassemblies. The orthomode transducer (OMT) and transceiver in the very small aperture terminal (VSAT) case, and the global low noise block downconverter (LNB) in the receive only case, can remained fixed to the back of the antenna reflector. This configuration eliminates the need for extra flexible cables and heavy load bearings to rotate the larger mass behind the reflector vertex.

In order to create a circular polarization, a ninety degree (90°, or equivalently, $\lambda/4$) phase delay is inserted into one linear polarization path of the dual polarized circular waveguide. The delay can be generated, for example, by a dielectric phase card, dielectric pins, metal ridges or metal pins. The phase delay is inserted at 45 degrees (45°, or equivalently, $\lambda/8$) relative to the linear polarization of the source. A ninety degree phase delay orientated at 45 degrees to the linear source polarization creates circular polarization.

In some situations, it is desirable to introduce a fixed amount of angular rotation, along the axis of propagation, to a linearly polarized signal. A rotation angle of $\phi$ is introduced to a linearly polarized signal if a 180 degree (180°; $\lambda/2$) phase delay is inserted at an angle of $\phi/2$ with respect to the source polarization.

In one aspect, the invention is a waveguide device, comprising a first circular waveguide configured to implement a $3\lambda/8$ relative phase shift between transmission of two orthogonal linear polarized signals transmitted at a first polarization orientation, and a second circular waveguide configured to impart a $\lambda/8$ relative phase shift between transmission of two orthogonal linear polarized signals transmitted at a second polarization orientation. The second circular waveguide segment may be coaxially adjacent to the first circular waveguide segment, along an axis to form a waveguide assembly. The waveguide device may further comprise a radiation source to provide dual linear polarized energy, characterized by a source polarization orientation, into the waveguide assembly. For a first operational mode of the waveguide assembly, the first circular waveguide is rotationally orientated about the axis with respect to the second waveguide, such that the first polarization orientation is offset by 90 degrees with respect to the second polarization orientation. The radiation source may be arranged such that the source polarization orientation is 45 degrees with respect to the first polarization orientation and the second polarization orientation. For a second operational mode of the waveguide assembly, the first circular waveguide is rotationally orientated about the axis with respect to the second waveguide, such that the first polarization orientation and the first polarization orientation are substantially the same.

In the second mode, the waveguide assembly may be configured to rotate within an angular range of plus or minus θ degrees about the source polarization orientation, where θ is a predetermined angle.

The waveguide device may further include a slip joint arranged to connect the first circular waveguide to the second circular waveguide. The slip joint may be configured to facilitate rotation of the first waveguide and the second waveguide with respect to one another about the axis.

The waveguide device may further include a motor assembly for independently rotating the first waveguide segment and the second waveguide segment about the axis. The motor assembly may comprise a first motor arranged to rotate the first circular waveguide, and a second motor arranged to rotate the second circular waveguide independent of the first circular waveguide. The motor assembly may comprise a motor arranged such that when the motor rotates the first and second circular waveguides in a first direction about the axis, the slip joint causes the first circular waveguide and the second circular waveguide to lock together in the first mode of the waveguide assembly. When the motor rotates the first and second circular waveguides about the axis in a second direction that is opposite to the first direction, the slip joint may cause the first circular waveguide and the second circular waveguide to lock together in the second mode of the waveguide assembly. When in the second mode of the waveguide assembly, and when the motor rotates in the second direction such that the first polarization orientation and the first polarization orientation is offset by a predetermined angle, the slip joint may cause the first circular waveguide and the second circular waveguide to unlock.

The waveguide device may further include a radiation source slip joint arranged to connect the radiation source to an end of the waveguide assembly. The radiation source slip joint may be configured to facilitate rotation of the radiation source and the waveguide assembly with respect to one another about the axis. The waveguide device may include a feed horn attached to an end of the waveguide assembly. In some embodiments, a feed horn slip joint may be attached to the feed horn and the waveguide assembly to facilitate rotational movement about the axis with respect to one another.

The waveguide device may implement the $3\lambda/8$ phase shift in the first circular waveguide with a first phase shift device that lies within a plane. The plane may intersect the axis and the opposing interior walls of the first circular waveguide, and the plane may be disposed in the first polarization orientation. The first phase shift device may extend to the opposing interior walls of the first waveguide and include a first end and a second end that terminates the phase shift device in a direction parallel to the axis. Each end of the first phase shift device may comprise a transition configured to implement an impedance match between the first phase shift device and the first circular waveguide. In some embodiments, the first phase shift device may comprise a dielectric material.

The waveguide device may implement the $\lambda/8$ phase shift in the second circular waveguide with a second phase shift device that lies within a plane. The plane may intersect the axis and the opposing interior walls of the second waveguide, and the plane may be disposed in the second polarization orientation. The second phase shift device may extend to the opposing interior walls of the second waveguide and include a first end and a second end that terminates the phase shift device in a direction parallel to the axis. Each end of the second phase shift device may comprise a transition configured to implement an impedance match between the second phase shift device and the second circular waveguide. In some embodiments, the second phase shift device may comprise a dielectric material.

In another aspect, the invention is a waveguide device, comprising a first circular waveguide segment disposed along an axis. The first circular waveguide comprises a first waveguide interior wall at a radius from the axis, a first waveguide first end and a first waveguide second end. The waveguide device further comprises a second circular waveguide segment disposed along the axis, with a first waveguide interior wall at the radius from the axis, a second waveguide first end and a second waveguide second end. The waveguide device comprises a slip joint attached to the first waveguide first end and the second waveguide second end to form a waveguide assembly. The slip joint facilitates rotation of the first waveguide and the second waveguide with respect to one another about the axis. The waveguide device also comprises a $3\lambda/8$ phase device disposed within the first waveguide along the axis. The $3\lambda/8$ phase shift device lies within a first plane that intersects the axis and opposing interior walls of the first waveguide. The waveguide device further comprises a $\lambda/8$ phase device disposed within the second waveguide along the axis. The $\lambda/8$ phase device lies within a second plane that intersects the axis and opposing interior walls of the second waveguide. The waveguide device further includes a radiation source arranged to provide dual polarized energy into the waveguide assembly, and a radiation source slip joint arranged to connect the radiation source to a first end of the waveguide assembly, the radiation source slip joint configured to facilitate rotation of the radiation source and the waveguide assembly with respect to one another about the axis. The waveguide device further includes a feed horn attached to a second end of the waveguide assembly.

In a first mode of the waveguide assembly, the first circular waveguide is axially orientated with respect to the second waveguide, such that the first plane is rotationally positioned about the axis by ninety degrees with respect to the second plane. The first plane and the second plane are each positioned forty five degrees with respect to an orientation of the radiation source. In a second mode of the waveguide assembly, the first circular waveguide is axially orientated with respect to the second waveguide such that the first plane and the second plane are coplanar, and the first plane and the second plane are each positioned θ degrees with respect to the radiation source, where θ is a predetermined angle.

The waveguide device may comprise a motor assembly for independently rotating the first waveguide segment and the second waveguide segment about the axis. The motor assembly may comprise a first motor arranged to rotate the first circular waveguide segment, and a second motor arranged to rotate the second circular waveguide segment. The motor assembly may comprise a motor arranged such that when the motor rotates the first and second circular waveguides in a first direction about the axis, the slip joint causes the first circular waveguide and the second circular waveguide to lock together in the first mode of the waveguide assembly. When the motor rotates the first and second circular waveguides about the axis in a second direction that is opposite to the first direction, the slip joint causes the first circular waveguide and the second circular waveguide to lock together in the second mode of the waveguide assembly. While in the second mode of the waveguide assembly, and when the motor rotates in the second direction such that the first polarization orientation and the first polarization orientation is offset by a predetermined angle, the slip joint causes the first circular waveguide and the second circular waveguide to unlock.

The $3\lambda/8$ phase shift device and the $\lambda/8$ phase shift device may each comprise a dielectric material. The $3\lambda/8$ phase shift device and the $\lambda/8$ phase shift device may each comprise at least one metal ridge inside the circular waveguide.

The $3\lambda/8$ phase shift card may extend to the opposing interior walls of the first waveguide and includes a first end and a second end that terminates the $3\lambda/8$ phase shift card in a direction parallel to the axis. Each of the first end and the second end may further comprise a transition configured to implement an impedance match between the $3\lambda/8$ phase shift card and the first circular waveguide.

The $\lambda/8$ phase shift card may extend to the opposing interior walls of the second waveguide and include a first end and a second end that terminates the $\lambda/8$ phase shift card in a direction parallel to the axis. Each of the first end and the second end may further comprise a transition configured to implement an impedance match between the $\lambda/8$ phase shift card and the second circular waveguide.

A feed horn slip joint may be attached to the feed horn and to the waveguide assembly, the feed horn slip joint configured to facilitate rotation, relative to one another, of the feed horn and the waveguide assembly about the axis. The feed horn may be fixedly attached to the waveguide assembly.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A and 2B illustrates interior components of the circular waveguide polarization device shown in FIG. 1.

DETAILED DESCRIPTION OF THE INVENTION

A description of example embodiments of the invention follows.

The teachings of all patents, published applications and references cited herein are incorporated by reference in their entirety.

Figure 1A:
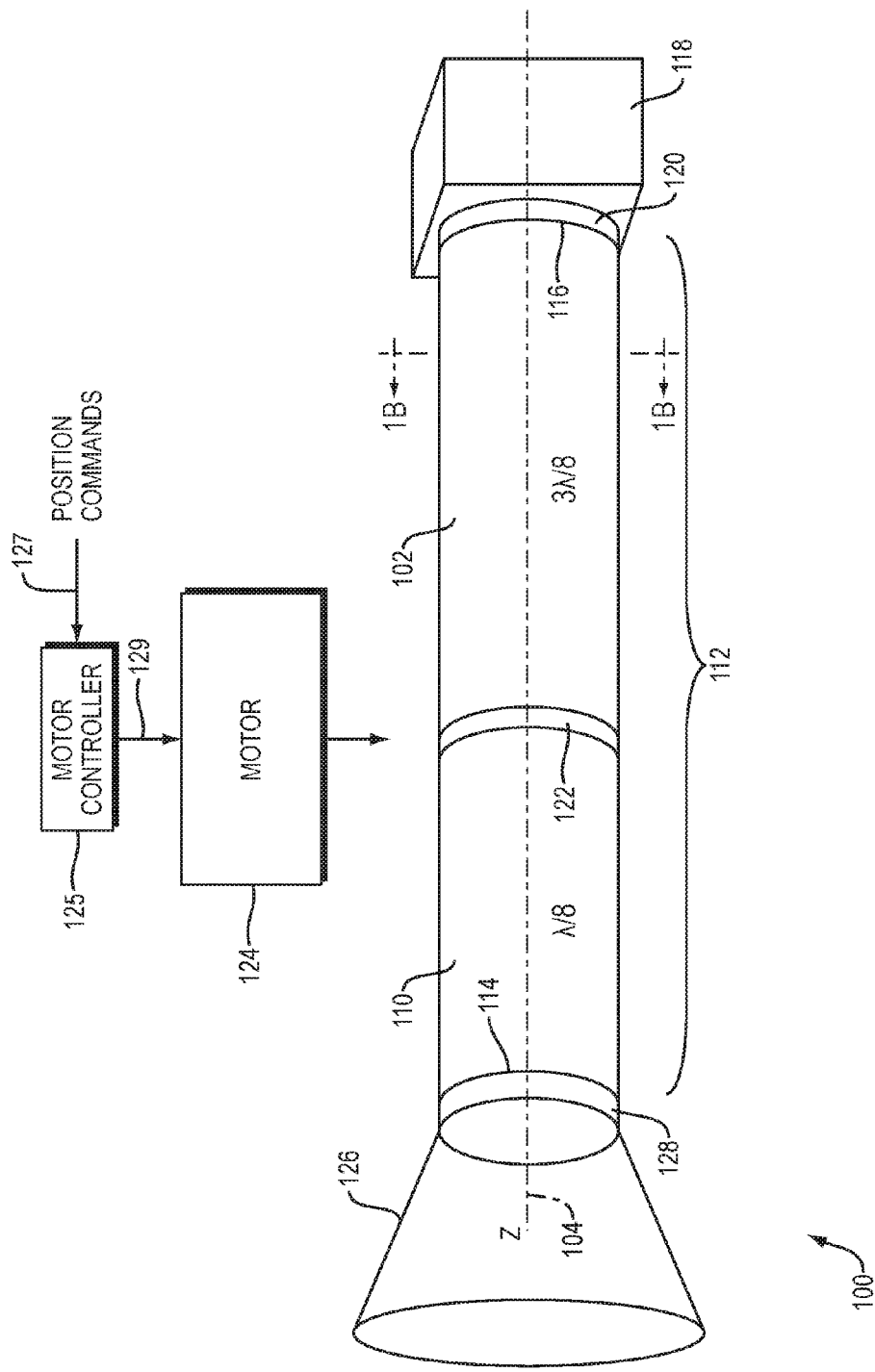
FIG. 1A illustrates an example embodiment of a circular waveguide polarization device according to the invention.

FIG. 1A illustrates an example embodiment of a circular waveguide polarization device 100 constructed and arranged according to the described embodiments. The example device 100 comprises a first circular waveguide 102 configured to implement a $3\lambda/8$ relative phase shift between two orthogonal linear polarized signals transmitted into the first circular waveguide 102 at a first polarization orientation.

Figure 1B:
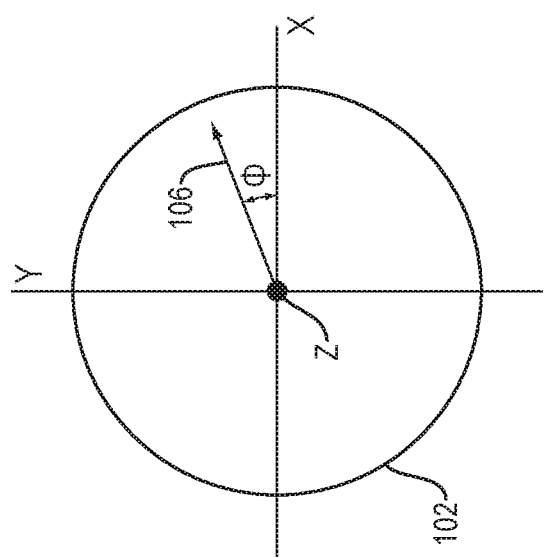
FIG. 1B shows a sectional view of a circular waveguide of the circular waveguide polarization of FIG. 1A.

As used herein, the "polarization orientation" of a signal refers the angular orientation of the transmitted signal's electrical field vector, with respect to a reference coordinate system. FIG. 1B an example of such a coordinate system. FIG. 1B shows a sectional view of a circular waveguide (e.g., first circular waveguide 102), with the Z axis being the longitudinal axis 104 along which the circular waveguide is disposed, and with X and Y axes that are orthogonal to one another, and orthogonal to the Z axis. An electrical field vector 108 is shown at an angle of $\Phi$ with respect to the X axis, at the point along the Z axis that the section is taken. So in this example, the polarization orientation of the electrical field vector 106 is given by $\Phi$, with respect to the X-Y coordinate reference plane.

The circular waveguide polarization device 100 further includes a second circular waveguide 110, configured to impart a $\lambda/8$ relative phase shift between two orthogonal linear polarized signals transmitted at a second polarization orientation. The second circular waveguide segment 110 is coaxially adjacent to the first circular waveguide segment along the longitudinal axis 104 to form a waveguide assembly 112. The waveguide assembly 112 includes a first end 114 and a second end 116.

In an example embodiment, the inside diameter of the first circular waveguide 102 and the second circular waveguide is 0.7 inches, with operating bands of 10.7 to 12.75 GHz and 14 to 14.5 GHz. The total length of the waveguide assembly 112 is 5.5 inches.

The circular waveguide polarization device 100 further includes a waveguide assembly input configured to receive dual linear polarized electromagnetic energy, characterized by a source polarization orientation, from a radiation source 118. In the example embodiment, the radiation source 118 provides first linear polarized electromagnetic energy oriented in a first direction (e.g., in the positive X direction of FIG. 1B) and second linear polarized electromagnetic energy oriented in a second direction, which is orthogonal to the first linear polarized electromagnet energy (e.g., in the positive Y direction of FIG. 1B).

In the example embodiment of FIG. 1A, the second end 116 of the waveguide assembly 112 is used as the waveguide assembly input. For alternative embodiments, the first end 114 of the waveguide assembly may be used to provide the waveguide assembly input. Also, as depicted in FIG. 1A, the radiation source 118 is shown at the second end 116 of the waveguide assembly 112 and situated about the longitudinal axis 104, so that dual linear polarized electromagnetic energy is transmitted directly into an end of the waveguide assembly 112 along the longitudinal axis 104. In other embodiments, however, the radiation source 118 may be situated in a different location with respect to the waveguide assembly input, and the dual linear polarized electromagnetic energy may be transmitted into the waveguide assembly 112 through alternative paths, for example through a side port or ports of the waveguide assembly 112.

For a first operational mode of the waveguide assembly 112, the first circular waveguide 102 is rotationally orientated about the axis with respect to the second waveguide 110, such that the first polarization orientation is offset by 90 degrees with respect to the second polarization orientation. The radiation source 118 is arranged such that the source polarization orientation is 45 degrees with respect to the first polarization orientation and the second polarization orientation. This first operational mode of the waveguide assembly produces circularly polarized radiation.

For a second operational mode of the waveguide assembly 112, the first circular waveguide 102 is rotationally orientated about the longitudinal axis 104 with respect to the second waveguide 110 such that the first polarization orientation and the first polarization orientation are substantially the same. In the configuration of this second mode of the waveguide assembly 112, the $3\lambda/8$ phase shift introduced by the first circular waveguide 102 adds to the $\lambda/8$ phase shift introduced by the second circular waveguide 110, so that the entire waveguide assembly 112 introduces a $\lambda/2$ phase shift. As described herein, when a $\lambda/2$ phase delay is inserted in the transmission path of a linearly polarized signal, at an angle of $\phi/2$ with respect to the source polarization, a rotation angle of $\phi$ is introduced to the linearly polarized signal. So in the second mode, the waveguide assembly may be configured to rotate about the longitudinal axis 104 to introduce an angular shift to the incoming linearly polarized signal.

A source circular slip joint 120 may be interposed between the first circular waveguide 102 and the radiation source 118 to facilitate rotation of the waveguide assembly 112 with respect to the radiation source 118, to implement the angular shift described above. In some embodiments, the rotation may be limited to occur within an angular range of plus or minus θ degrees about the source polarization orientation, where θ is a predetermined angle. For example, the rotation may be limited to occur within an angular range of plus or minus 20 degrees about the source polarization orientation, although other predetermined angles may alternatively be used.

An inter-waveguide slip joint 122 may be included to connect the first circular waveguide to the second circular waveguide. The inter-waveguide slip joint 122 may be configured to facilitate rotation of the first waveguide 102 and the second waveguide 110, with respect to one another, about the axis 104.

The circular waveguide polarization device 100 may include a motor assembly 124 for rotating the waveguide assembly 112 or portions of the waveguide assembly 112 about the axis 104. The circular waveguide polarization device 100 may further comprise a motor controller 125, which receives position commands 127 from an external source (not shown) and converts the position commands 127 into control signals 129 suitable for controlling the motor assembly 124. The motor controller 125 may include processing components necessary to convert the position commands 127 into control signals 129 and to perform other associated actions.

The motor assembly 124 may comprise a stepper motor as is known in the art, although in alternative embodiments other types of motors capable of controlling angular position may be used. In some embodiments, the motor assembly may be configured to independently rotate the first waveguide segment 102 and the second waveguide segment 110, with respect to one another, about the axis 104. In such embodiments, the motor assembly may comprise a first motor (subsumed within the motor assembly 124; not explicitly shown) arranged to rotate the first circular waveguide 102, and a second motor (subsumed within the motor assembly 124; not explicitly shown) arranged to rotate the second circular waveguide 110 independent of the first circular waveguide 102.

In other embodiments, the motor assembly 124 may comprise a single motor arranged such that when the motor assembly 124 rotates the first circular waveguide 102 and the second circular waveguide 110 in a first direction about the axis 104, the slip joint 122 causes the first circular waveguide 102 and the second circular waveguide 110 to lock together in the first mode of the waveguide assembly 112. When the motor assembly 124 rotates the first circular waveguide 102 and second circular waveguide 110 about the axis 104 in a second direction that is opposite to the first direction, the slip joint 122 causes the first circular waveguide 102 and the second circular waveguide 110 to lock together in the second mode of the waveguide assembly. When in the second mode of the waveguide assembly 112, and when the motor assembly 124 rotates in the second direction such that the first polarization orientation and the first polarization orientation is offset by a predetermined angle θ, the slip joint 122 causes the first circular waveguide 102 and the second circular waveguide 110 to unlock.

The circular waveguide polarization device 100 may further include a feed horn 126 attached to an end of the waveguide assembly 112. In some embodiments, the circular waveguide polarization device 100 may include a feed horn slip joint 128 coupling the feed horn 126 to the waveguide assembly 112 to allow rotational movement of the feed horn 126 to the waveguide assembly 112 with respect to one another about the axis 104.

The circular waveguide polarization device 100 operates in a reciprocal nature. Accordingly the circular waveguide polarization device 100 may further include a receiver attached to or otherwise associated with the first end of the waveguide assembly. The receiver may be configured to receive electromagnetic energy, transmitted through the waveguide assembly directed from the second end to the first end, and modified as described herein by the phase shift devices.

It should be understood that although the radiation source 118 and the receiver (not shown) are described in the example embodiment as being attached to or otherwise associated with an end of the waveguide assembly 112, in some embodiments the radiation source 118 and/or the receiver may be located apart from the waveguide assembly 112. For example, the waveguide assembly 112 may have attached or otherwise associated with it an orthomode transducer (OMT) for conveying electromagnetic energy to and/or from the waveguide assembly 112. In such embodiments, transmission paths such as waveguides may be employed to convey electromagnetic energy between the waveguide assembly 112 and the radiation source and/or receiver.

Figure 2B:
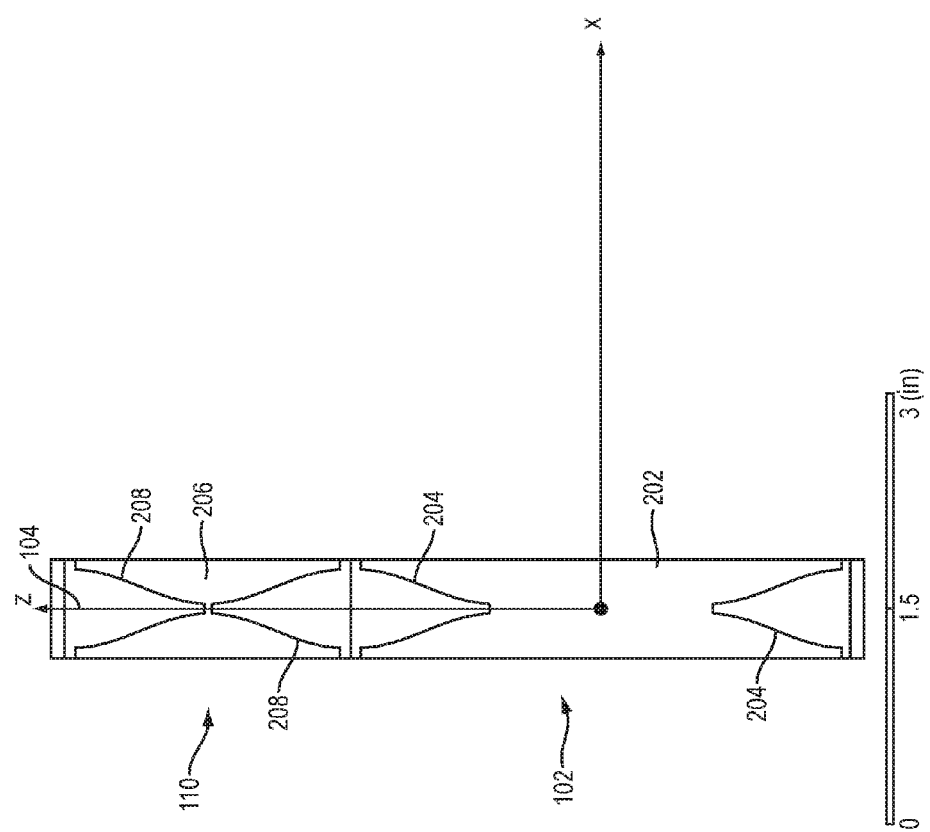

FIGS. 2A and 2B illustrate interior components of the circular waveguide polarization device 100 shown in FIG. 1. The first circular waveguide 102 may implement the $3\lambda/8$ phase shift by utilizing a first phase shift device 202 that lies within a plane that intersects the axis 104 and the opposing interior walls of the first waveguide 102. In this example embodiment, the first phase shift device 202 extends to the opposing interior walls of the first waveguide 102 and includes a first end and a second end that terminates the first phase shift device 202 in a direction parallel to the axis 104. Each end of the first phase shift device 202 comprises a transition 204 configured to implement an impedance match between the first phase shift device and the first circular waveguide 102.

In one embodiment, the first phase shift device 202 comprises a dielectric material, although for other embodiments the phase shift device may comprise other materials instead of or in addition to dielectric materials. In an example embodiment, the dielectric material may be RO003 produced by Rogers Corporation, with a dielectric constant of 3.55, a loss tangent of 0.0027, and a thickness of 0.032 inches. For this example embodiment, the first phase shift device 202 is a dielectric card 3.5 inches in length, and the second phase shift device is a dielectric card 2.0 inches in length.

The second circular waveguide 110 may implement the $\lambda/8$ phase shift with a second phase shift device 206 that lies within a plane that intersects the axis 104 and the opposing interior walls of the second waveguide 110. In this example embodiment, the second phase shift device 206 extends to the opposing interior walls of the first waveguide 102 and includes a first end and a second end that terminates the second phase shift card 206 in a direction parallel to the axis 104. Each end of the second phase shift device 206 comprises a transition 208 configured to implement an impedance match between the first phase shift device and the first circular waveguide 102. In one embodiment, the second phase shift device 206 comprises a dielectric material, although for other embodiments the phase shift device may comprise other materials instead of or in addition to dielectric materials.

While the phase shift devices described for the example embodiment are dielectric cards as described above, it should be understood that other techniques for implementing a phase delay may also be used. For example, one or more of the phase shift devices of the waveguide assembly 112 may comprise at least one metal ridge inside the circular waveguide.

Figure 3A:
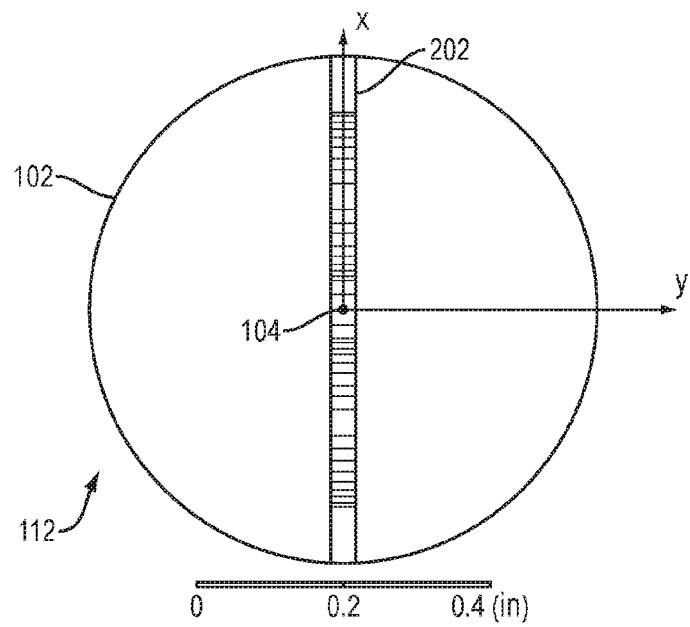
FIGS. 3A and 3B illustrate an end-view of an example waveguide assembly configured in the second operational mode of the invention.
Figure 3B:
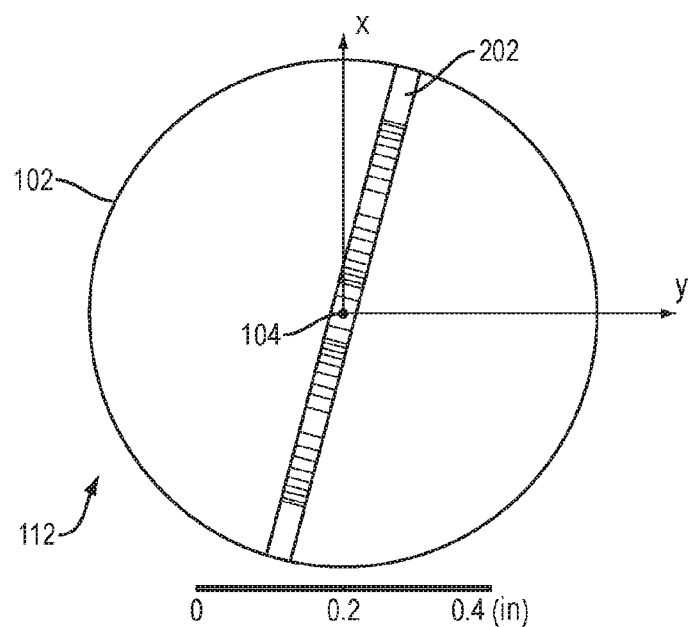

FIGS. 3A and 3B illustrate an end-view of an example waveguide assembly 112 configured in the second operational mode described herein (i.e., linear polarization). FIG. 3A shows the first phase shift device 202 and the second phase shift device 206 within a common plane, and rotated at an angle of 0° with respect to the electromagnetic radiation source polarization, resulting in a 0° skew angle. In this example view, looking into the first circular waveguide 102, only the first phase shift device 202 can be seen. FIG. 3B shows the first phase shift device 202 and the second phase shift device 206 within a common plane, and rotated at an angle of $\phi/2$ (e.g., 10°) with respect to the electromagnetic radiation source polarization, resulting in a skew angle of $\phi$ (i.e., 20°).

Figure 4A:
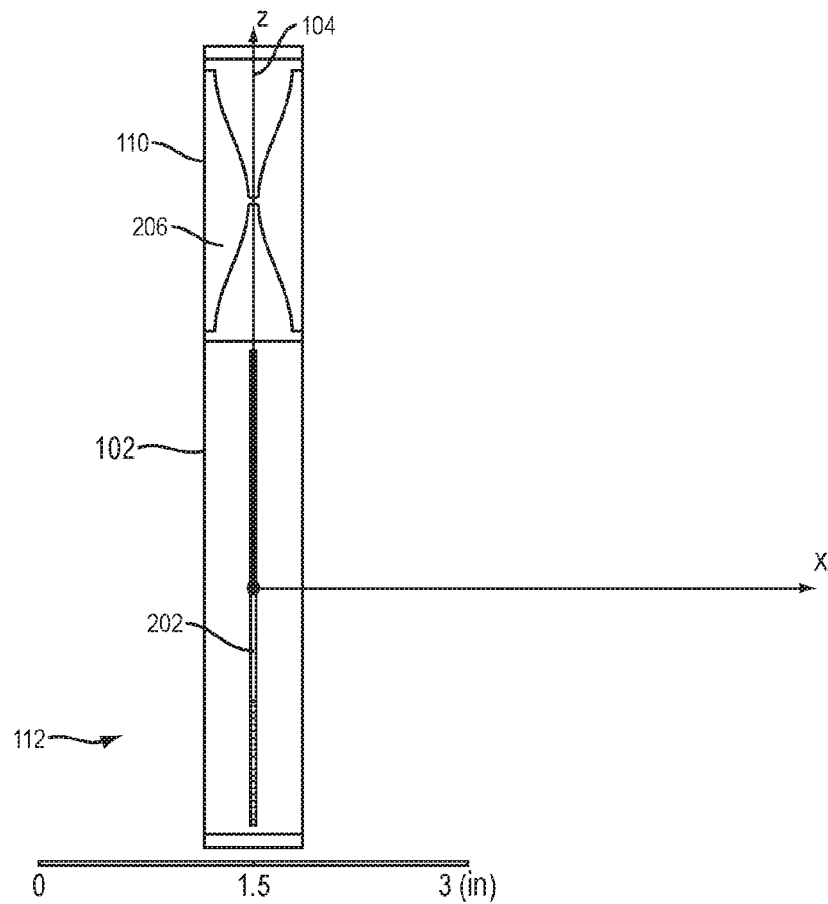
FIGS. 4A and 4B illustrate a side internal view and an end view, respectively, of an example waveguide assembly configured in the first operational mode of the invention.
Figure 4B:
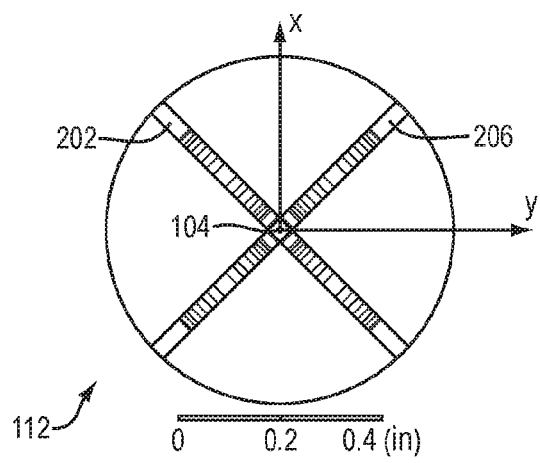

FIG. 4A illustrates a side internal view, and FIG. 4B illustrates an end view, of an example waveguide assembly 112 configured in the first operational mode described herein (i.e., circular polarization), with the first phase shift device 202 and the second phase shift device 206 oriented at 90° with respect to one another. FIG. 4A shows the first circular waveguide 102 with the first phase shift device 202 seen edge-on, and the second circular waveguide 110 with the second phase shift device 206 seen spanning the second circular waveguide from sidewall to sidewall. FIG. 4B shows an end-view of the waveguide assembly 112, looking into the first circular waveguide 102. In this example embodiment, the source polarization is such that the linearly polarized fields are oriented with respect to the x and y axes shown, such that the first phase shift device 202 and the second phase shift device 206 are oriented at 45° with respect to the source linearly polarized fields.

Figure 5:
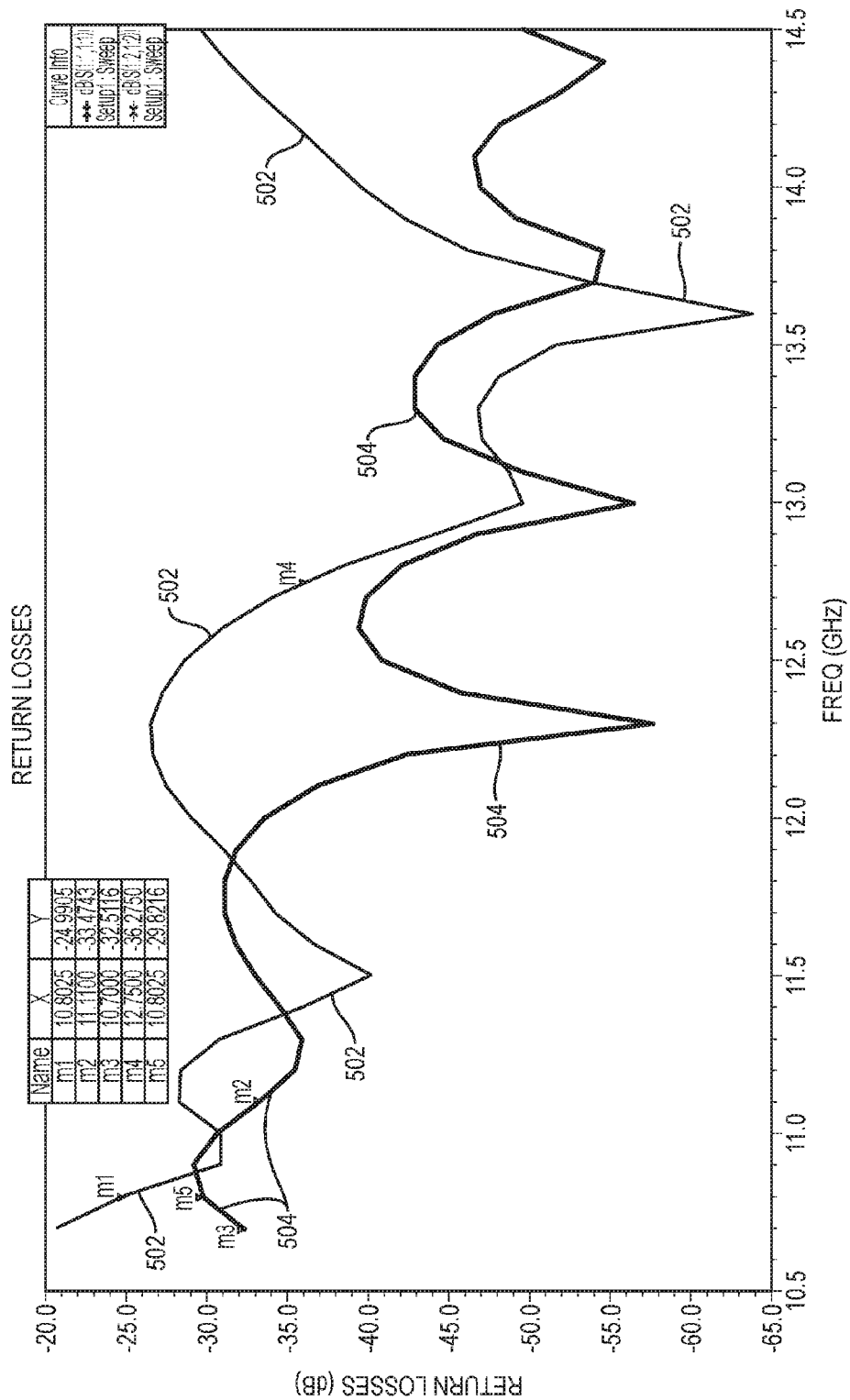
FIG. 5 illustrates the reflection levels for the example LP configuration with both phase cards parallel.

FIG. 5 illustrates the reflection levels, also known as return loss levels, for the example linear polarization configuration with both phase cards parallel, as shown in FIGS. 2B, 3A and 3B. The return losses for the input vertical polarization mode, depicted by v_trace 502, and the input horizontal polarization mode, depicted by h_trace 504, are both shown in FIG. 5. The worst-case return loss level for both polarization modes, as FIG. 5 shows, is 20 dB from 10.7 to 14.5 GHz.

Figure 6A:
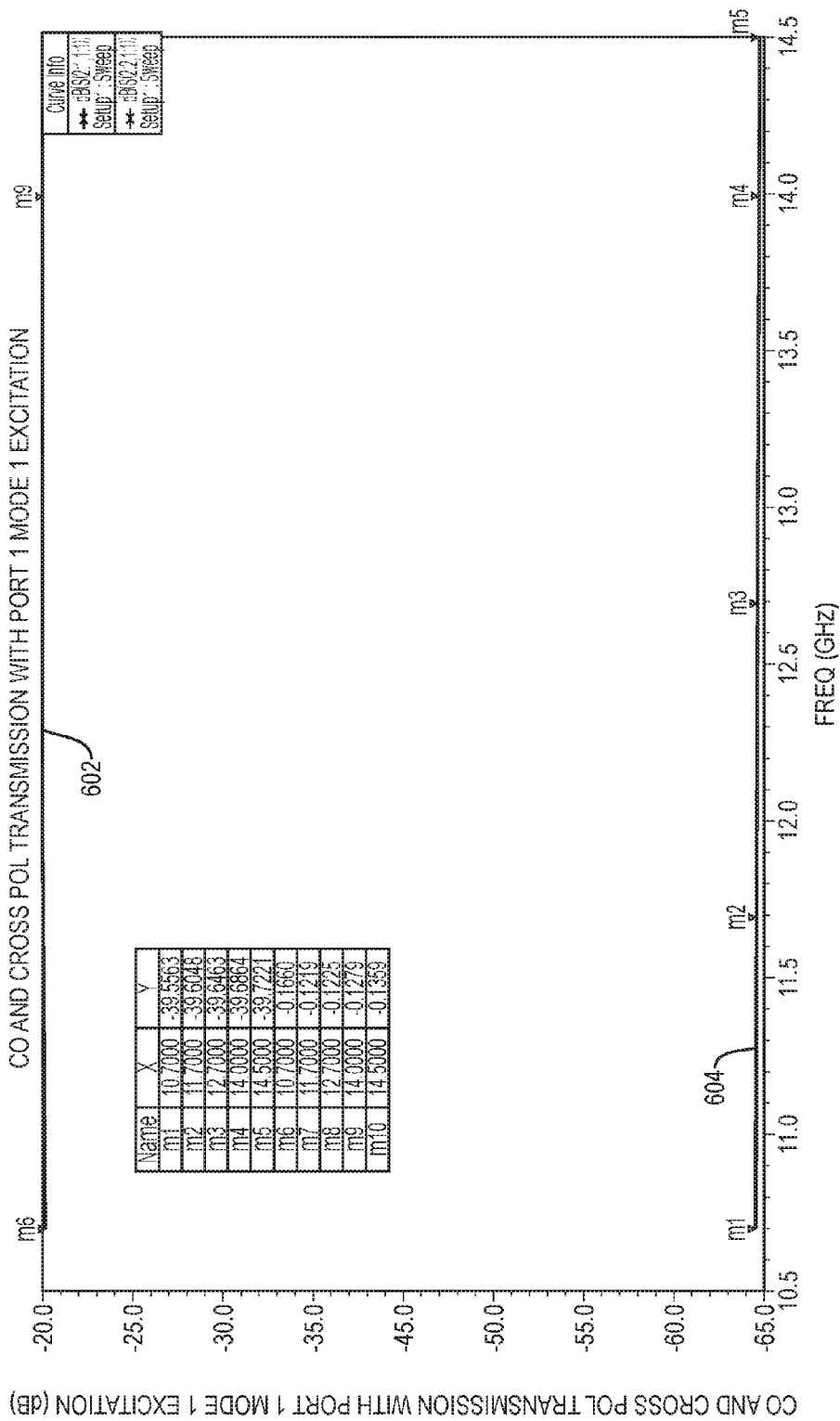
FIG. 6A shows the transmitted output modes for the example LP configuration with both phase cards parallel and mode 1 excitation.

FIG. 6A shows the transmitted output modes for the example linear polarization configuration with both phase cards parallel, as shown in FIGS. 2B, 3A and 3B, and mode 1 excitation. The transmission level for the vertical polarized mode, depicted by v_trace 602, is −0.16 dB, i.e., nearly 0.0 dB, when the vertical polarized mode is injected at the input. The transmission level for the opposite polarized mode, horizontal polarized mode, depicted by h_trace 604, is −35.5 dB when the vertical polarized mode is injected at the input of the waveguide assembly 112.

Figure 6C:
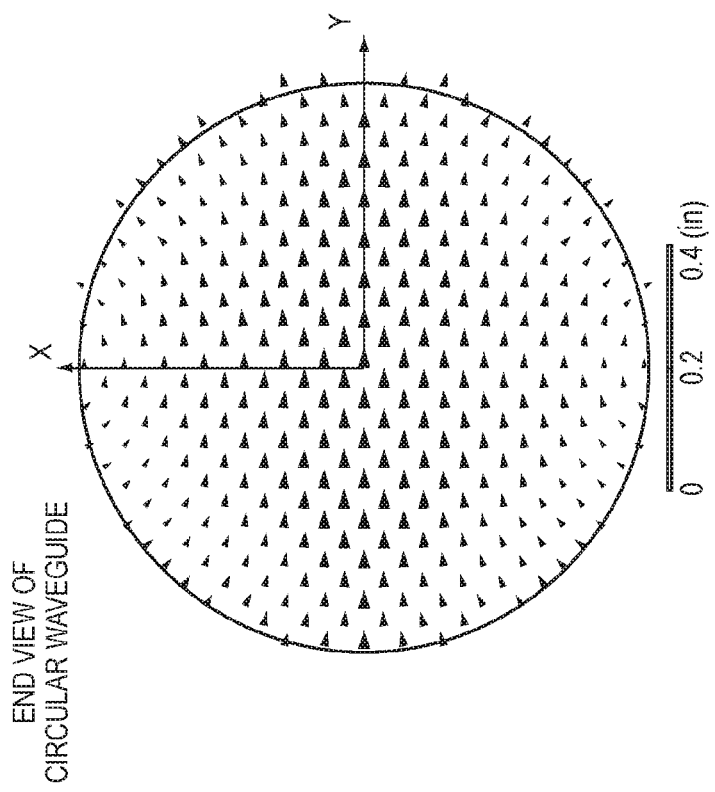
FIG. 6C illustrates electric field alignment for port 1, mode 2.
Figure 6B:
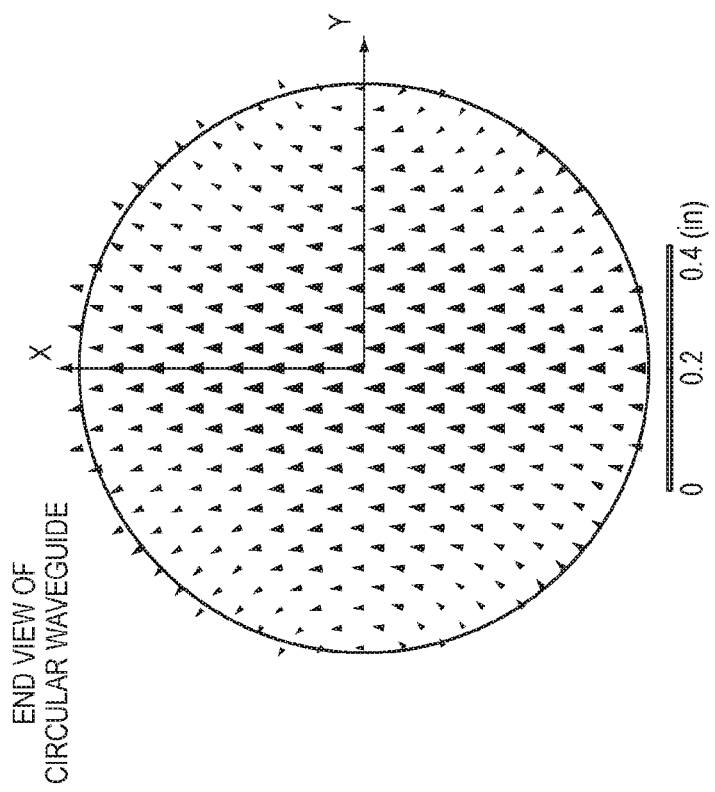
FIG. 6B illustrates electric field alignment for port 1, mode 1.

Circular waveguides support propagation of two orthogonally polarized dominant waveguide modes. The modes are known as $TE_{11}$ modes. The nomenclature used at the circular waveguide input is Port 1, Mode 1 and Port 1, Mode 2. The electric field directions of these circular waveguide input modes are exhibited in FIGS. 6B and 6C. FIG. 6B illustrates port 1, mode 1, the electric field aligned with the X axis, and FIG. 6C illustrates port 1, mode 2, the electric field aligned with the Y axis.

Figure 7:
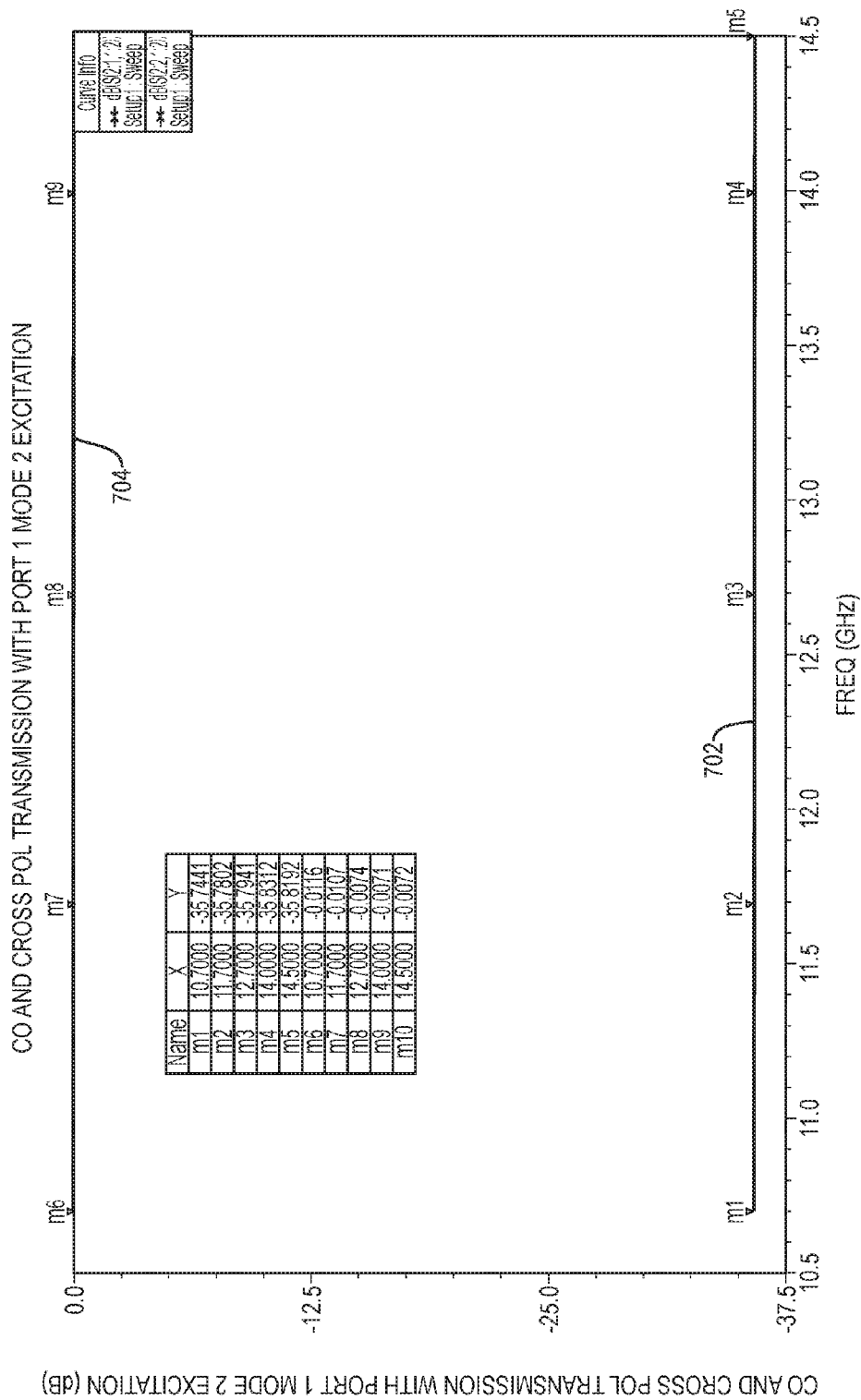
FIG. 7 shows the transmitted output modes for the example LP configuration with both phase cards parallel and mode 2 excitation.

FIG. 7 shows the transmitted output modes for the example linear polarization configuration with both phase cards parallel, as shown in FIGS. 2B, 3A and 3B, and mode 2 excitation. The transmission level for the horizontal polarized mode, depicted by h_trace 702, is −0.02 dB, i.e., nearly 0.0 dB, when the horizontal polarized mode is injected at the input of the waveguide assembly 112. The transmission level for the opposite polarized mode, vertical polarized mode, depicted by v_trace 704, is −35.7 dB when the horizontal polarized mode is injected at the input of the waveguide assembly 112.

Figure 8:
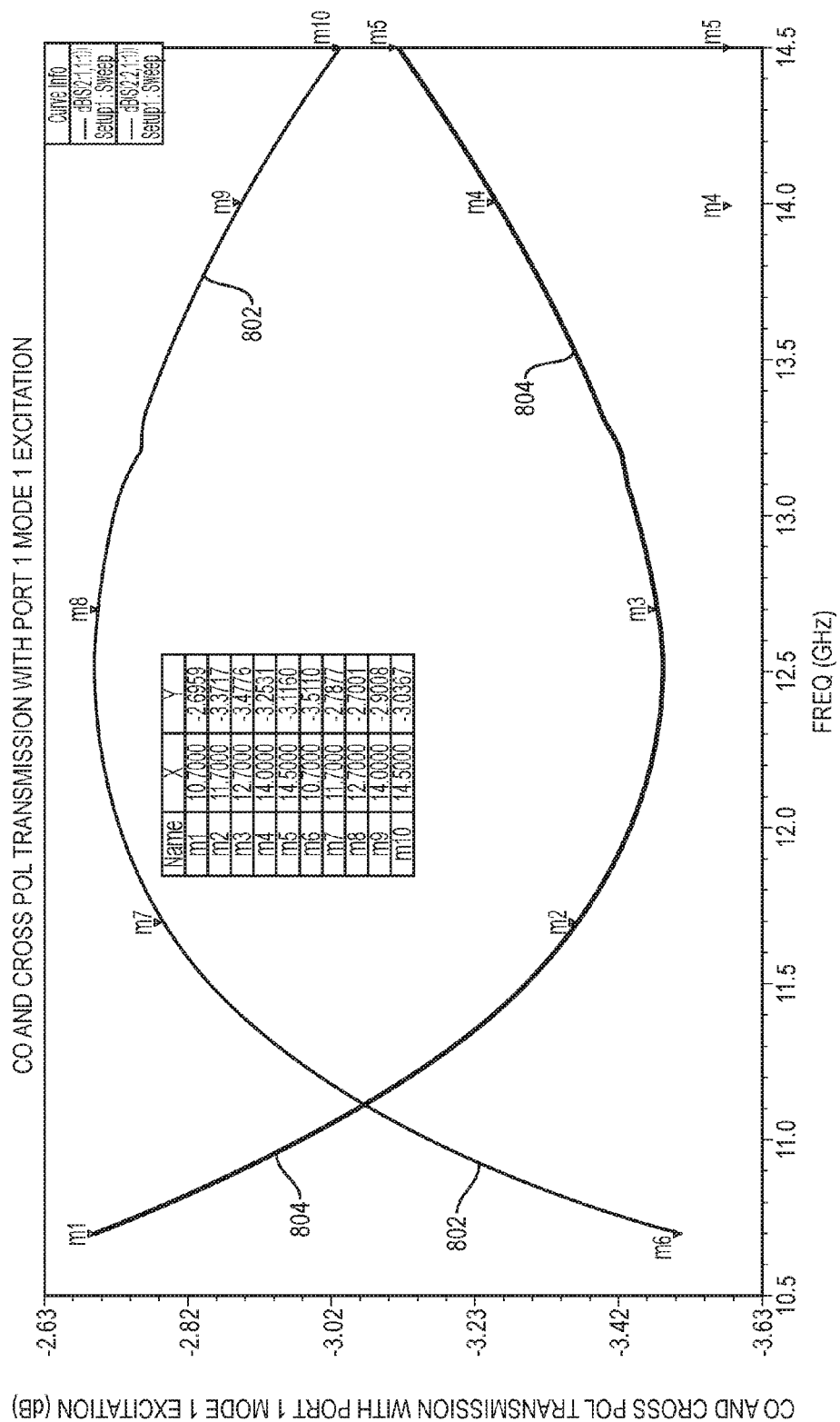
FIG. 8 shows the transmitted output modes for the example CP configuration

FIG. 8 shows the transmitted output modes for the example circular polarization configuration, as shown in FIGS. 4A and 4B. The transmission level for the vertical polarized mode, shown with v_trace 802, varies around −3 dB when the vertical polarized mode is injected at the input of the waveguide assembly 112. The transmission level for the opposite polarized mode, horizontal polarized mode, shown with v_trace 804, also varies around −3 dB when the vertical polarization mode is injected at the input. At any frequency, the difference between these two curves represents the axial ratio of the circular polarized output mode. For example, across the transmit Ku-band, between 14.0 and 14.5 GHz, the worst case axial ratio is 0.36 dB. Across the receive Ku-band, between 10.70 and 12.75 GHz, the worst case axial ratio is 0.82 dB.

Figure 9:
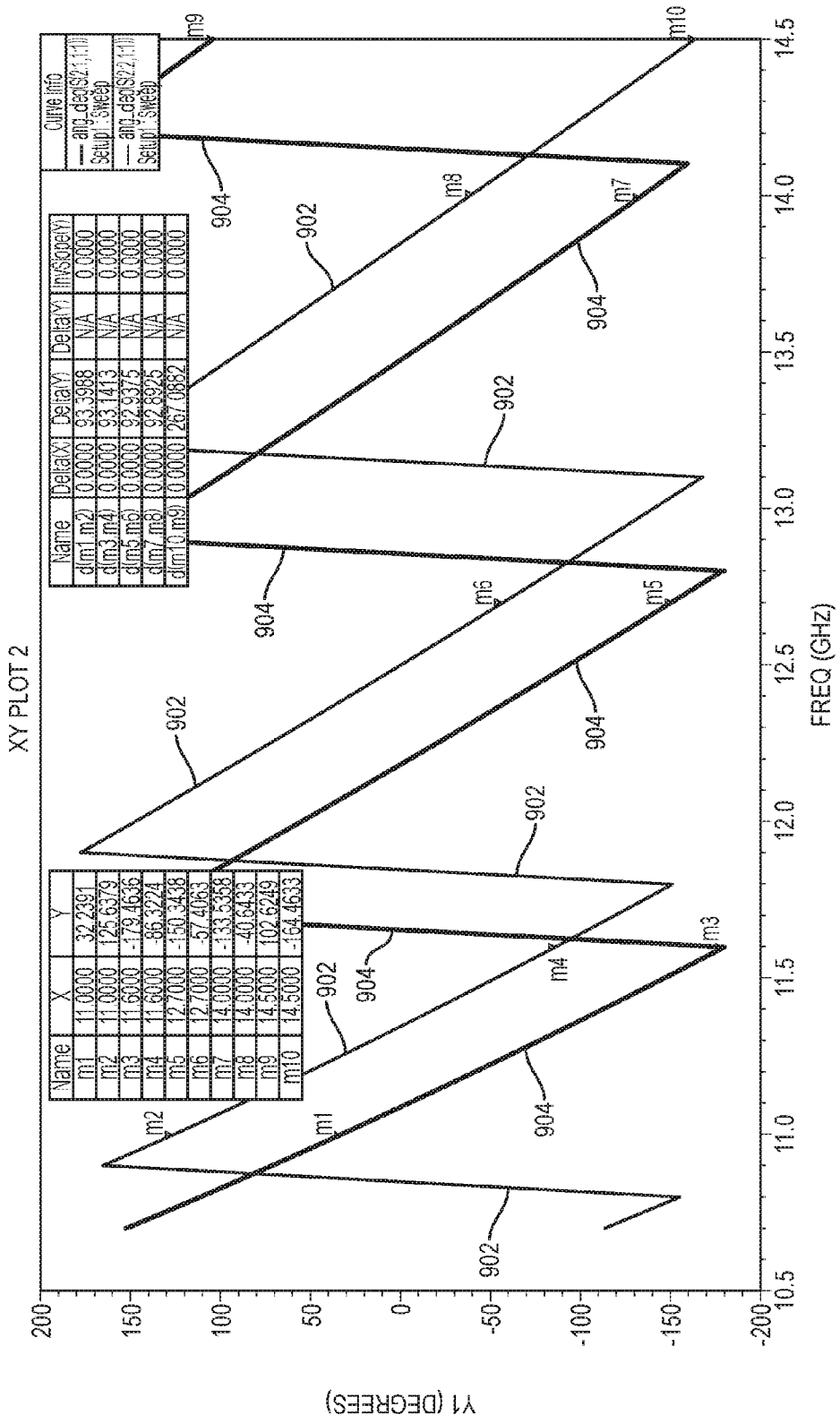
FIG. 9 shows the transmitted phase of the output modes for the example circular polarization configuration.

FIG. 9 shows the transmitted phase of the output modes for the example circular polarization configuration, as shown in FIGS. 4A and 4B. The transmitted phase of the vertical polarized mode, when the vertical polarized mode is injected at the input, is depicted by v_trace 902. The transmitted phase of the opposite polarized mode, the horizontal polarized mode, when the vertical polarization mode is injected at the input of the waveguide assembly 112, is depicted by h_trace 904. At any frequency, the difference between these two curves represents the relative phase of the device between the two orthogonal polarization output modes when orientated in the circular polarized configuration. For example, across the Ku-band, the relative phase between the output polarization modes is less than 3.5 degrees from 90 degrees. As described herein, a relative delay of 90 degrees between the output polarization modes results in a pure circular polarized signal for a perfect linear polarized input signal.

Figure 10:
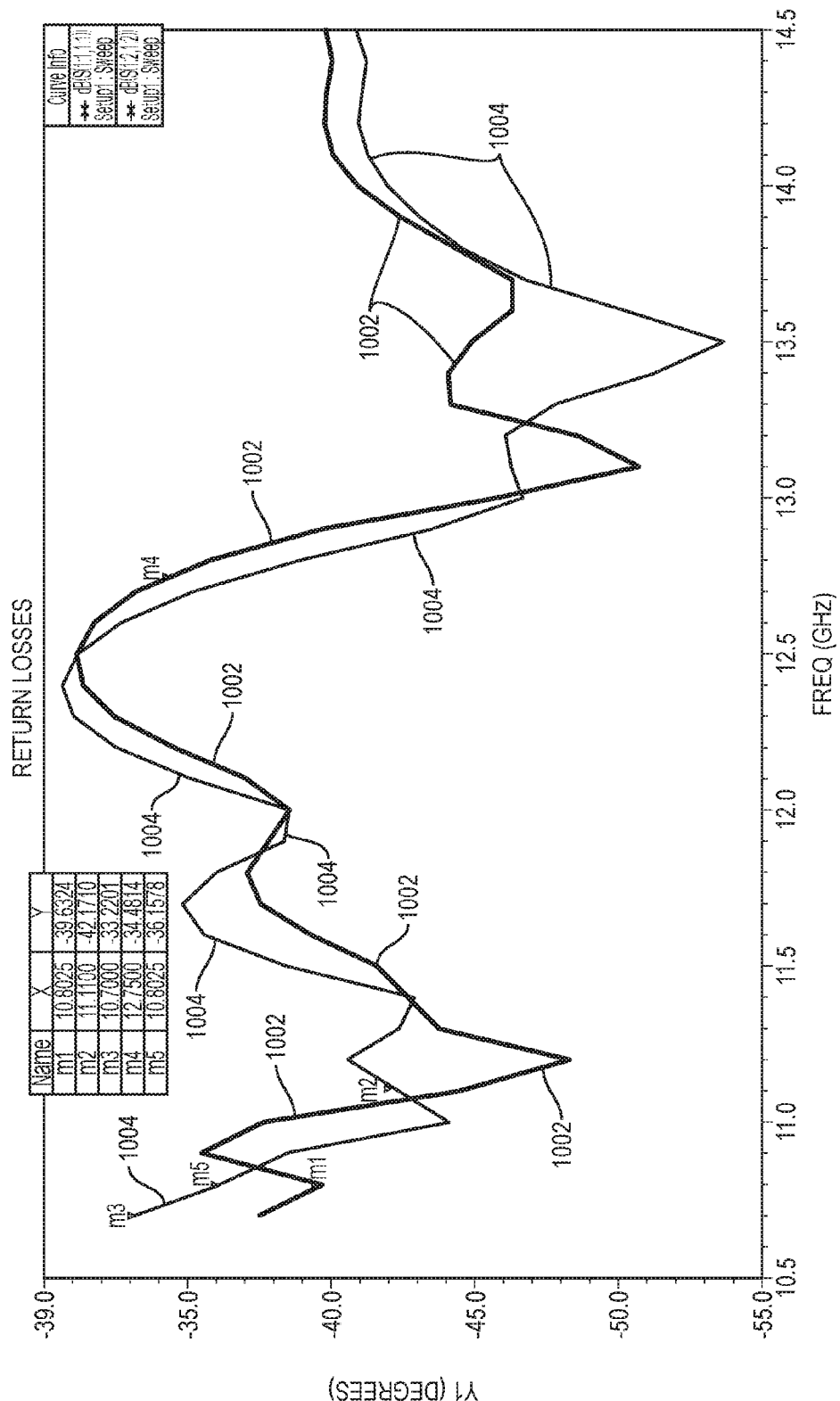
FIG. 10 shows the reflection levels for the example circular polarization configuration.

FIG. 10 shows the reflection levels, also known as return loss levels, for the example circular polarization configuration, as shown in FIGS. 4A and 4B. The return losses for the input vertical polarization mode, depicted by v_trace 1002, and the input horizontal polarization mode, depicted by h_trace 1004, are both shown in this figure. The worst-case return loss level for both polarization modes is 30 dB from 10.7 to 14.5 GHz.

Figure 11:
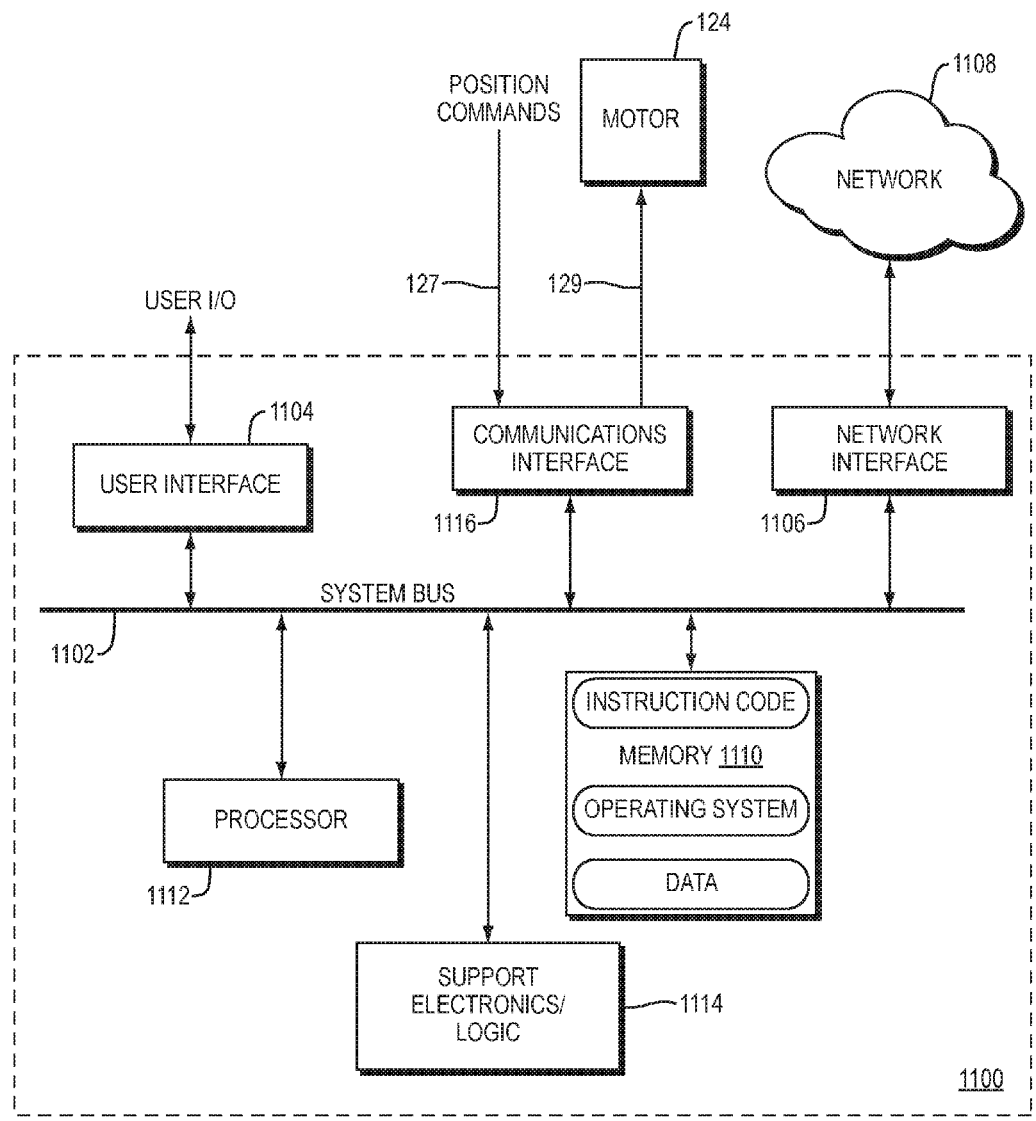
FIG. 11 is a diagram of an example internal structure of a processing system that may be used to implement one or more of the embodiments.

FIG. 11 is a diagram of an example internal structure of a processing system 1100 that may be used to implement one or more of the embodiments described herein, for example the motor controller 125 described herein with respect to FIG. 1A.

Each processing system 1100 contains a system bus 1102, where a bus is a set of hardware lines used for data transfer among the components of a computer or processing system. The system bus 1102 is essentially a shared conduit that connects different components of a processing system (e.g., processor, disk storage, memory, input/output ports, network ports, etc.) that enables the transfer of information between the components.

Attached to the system bus 1102 is a user I/O device interface 1104 for connecting various input and output devices (e.g., keyboard, mouse, displays, printers, speakers, etc.) to the processing system 1100. A network interface 1106 allows the computer to connect to various other devices attached to a network 1108. Memory 1110 provides volatile and non-volatile storage for information such as computer software instructions used to implement one or more of the embodiments of the present invention described herein, for data generated internally and for data received from sources external to the processing system 1100.

A central processor unit 1112 is also attached to the system bus 1102 and provides for the execution of computer instructions stored in memory 1110. The system may also include support electronics/logic 1114, and a communications interface 1116. The communications interface may provide control signals 129 to the motor 124, and receive position commands 127, described with reference to FIG. 1A.

In one embodiment, the information stored in memory 1110 may comprise a computer program product, such that the memory 1110 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A waveguide device, comprising:
a first circular waveguide configured to implement a $3\lambda/8$ relative phase shift between transmission of two orthogonal linear polarized signals transmitted at a first polarization orientation;
a second circular waveguide configured to impart a $\lambda/8$ relative phase shift between transmission of two orthogonal linear polarized signals transmitted at a second polarization orientation, the second circular waveguide segment coaxially adjacent to the first circular waveguide segment along an axis to form a waveguide assembly, the waveguide arranged to operate in conjunction with a radiation source configured to provide dual linear polarized energy, characterized by a source polarization orientation, into the waveguide assembly;
for a first operational mode of the waveguide assembly, the first circular waveguide is rotationally orientated about the axis with respect to the second waveguide, such that the first polarization orientation is offset by 90 degrees with respect to the second polarization orientation, the radiation source arranged such that the source polarization orientation is 45 degrees with respect to the first polarization orientation and the second polarization orientation; and
for a second operational mode of the waveguide assembly, the first circular waveguide is rotationally orientated about the axis with respect to the second waveguide such that the first polarization orientation and the first polarization orientation are substantially the same.

2. The waveguide device of claim 1, wherein in the second operational mode, the waveguide assembly is configured to rotate within an angular range of plus or minus θ degrees about the source polarization orientation, where θ is a predetermined angle.

3. The waveguide device of claim 1, further including a slip joint arranged to connect the first circular waveguide to the second circular waveguide, the slip joint configured to facilitate rotation of the first waveguide and the second waveguide with respect to one another about the axis.

4. The waveguide device of claim 3, further including a motor assembly for independently rotating the first waveguide segment and the second waveguide segment about the axis.

5. The waveguide device of claim 4, wherein the motor assembly comprises a first motor arranged to rotate the first circular waveguide, and a second motor arranged to rotate the second circular waveguide independent of the first circular waveguide.

6. The waveguide device of claim 4, wherein the motor assembly comprises a motor arranged such that:
 (i) when the motor rotates the first and second circular waveguides in a first direction about the axis, the slip joint causes the first circular waveguide and the second circular waveguide to lock together in the first operational mode of the waveguide assembly;
 (ii) when the motor rotates the first and second circular waveguides about the axis in a second direction that is opposite to the first direction, the slip joint causes the first circular waveguide and the second circular waveguide to lock together in the second operational mode of the waveguide assembly; and
 (iii) when in the second operational mode of the waveguide assembly, and when the motor rotates in the second direction such that the first polarization orientation and the first polarization orientation is offset by a predetermined angle, the slip joint causes the first circular waveguide and the second circular waveguide to unlock.

7. The waveguide device of claim 3, further including a radiation source slip joint arranged to connect the radiation source to an end of the waveguide assembly, the radiation source slip joint configured to facilitate rotation of the radiation source and the waveguide assembly with respect to one another about the axis.

8. The waveguide device of claim 1, further including a feed horn attached to an end of the waveguide assembly.

9. The waveguide device of claim 1, wherein the first circular waveguide implements the 3λ/8 phase shift with a phase shift device that lies within a plane, the plane intersects the axis and the opposing interior walls of the first waveguide, the plane is disposed in the first polarization orientation.

10. The waveguide device of claim 9, wherein the phase shift device (i) extends to the opposing interior walls of the first waveguide and (ii) includes a first end and a second end that terminates the phase shift device in a direction parallel to the axis, each end of the phase shift device comprises a transition configured to implement an impedance match between the phase shift device and the first circular waveguide.

11. The waveguide device of claim 9, wherein the phase shift device comprises a dielectric material.

12. The waveguide device of claim 1, wherein the second circular waveguide implements the λ/8 phase shift with a phase shift device that lies within a plane, the plane intersects the axis and the opposing interior walls of the second waveguide, the plane is disposed in the second polarization orientation.

13. The waveguide device of claim 12, wherein the phase shift device (i) extends to the opposing interior walls of the second waveguide and (ii) includes a first end and a second end that terminates the phase shift device in a direction parallel to the axis, each end of the phase shift device comprises a transition configured to implement an impedance match between the phase shift device and the second circular waveguide.

14. The waveguide device of claim 12, wherein the phase shift device comprises a dielectric material.

15. An electromagnetic transmission system, comprising:
 a first circular waveguide segment disposed along an axis, the first circular waveguide comprising a first waveguide interior wall at a radius from the axis, a first waveguide first end and a first waveguide second end;
 a second circular waveguide segment disposed along the axis, the second circular waveguide comprising a first waveguide interior wall at the radius from the axis, a second waveguide first end and a second waveguide second end;
 a slip joint attached to the first waveguide first end and the second waveguide second end to form a waveguide assembly, the slip joint facilitates rotation of the first waveguide and the second waveguide with respect to one another about the axis;
 a 3λ/8 phase shift device disposed within the first waveguide along the axis, the 3λ/8 phase shift device lies within a first plane that intersects the axis and opposing interior walls of the first waveguide;
 a λ/8 phase shift device disposed within the second waveguide along the axis, the λ/8 phase shift device lies within a second plane that intersects the axis and opposing interior walls of the second waveguide;
 a radiation source arranged to provide dual polarized energy into the waveguide assembly;
 a radiation source slip joint arranged to connect the radiation source to a first end of the waveguide assembly, the radiation source slip joint configured to facilitate rotation of the radiation source and the waveguide assembly with respect to one another about the axis;
 a feed horn attached to a second end of the waveguide assembly;
 in a first operational mode of the waveguide assembly, the first circular waveguide is axially orientated with respect to the second waveguide such that the first plane is rotationally positioned about the axis by ninety degrees with respect to the second plane, and the first plane and the second plane are each positioned forty five degrees with respect to an orientation of the radiation source; and
 in a second operational mode of the waveguide assembly, the first circular waveguide is axially orientated with respect to the second waveguide, such that the first plane and the second plane are coplanar, and the first plane and the second plane are each positioned θ degrees with respect to the radiation source, where θ is a predetermined angle.

16. The waveguide device of claim 15, further including a motor assembly for independently rotating the first waveguide segment and the second waveguide segment about the axis.

17. The waveguide device of claim 16, wherein the motor assembly comprises a first motor arranged to rotate the first circular waveguide segment, and a second motor arranged to rotate the second circular waveguide segment.

18. The waveguide device of claim 16, wherein the motor assembly comprises a motor arranged such that:

(i) when the motor rotates the first and second circular waveguides in a first direction about the axis, the slip joint causes the first circular waveguide and the second circular waveguide to lock together in the first mode of the waveguide assembly;

(ii) when the motor rotates the first and second circular waveguides about the axis in a second direction that is opposite to the first direction, the slip joint causes the first circular waveguide and the second circular waveguide to lock together in the second mode of the waveguide assembly; and (iii) when in the second mode of the waveguide assembly, and when the motor rotates in the second direction such that the first polarization orientation and the first polarization orientation is offset by a predetermined angle, the slip joint causes the first circular waveguide and the second circular waveguide to unlock.

19. The waveguide device of claim 15, wherein the $3\lambda/8$ phase shift device and the $\lambda/8$ phase shift device each comprises a dielectric material.

20. The waveguide device of claim 15, wherein the $3\lambda/8$ phase shift device and the $\lambda/8$ phase shift device each comprises at least one metal ridge inside the circular waveguide.

21. The waveguide device of claim 15, wherein the $3\lambda/8$ phase shift card extends to the opposing interior walls of the first waveguide and includes a first end and a second end that terminates the $3\lambda/8$ phase shift card in a direction parallel to the axis, each of the first end and the second end further comprises a transition configured to implement an impedance match between the $3\lambda/8$ phase shift card and the first circular waveguide.

22. The waveguide device of claim 15, wherein the $\lambda/8$ phase shift card extends to the opposing interior walls of the second waveguide and includes a first end and a second end that terminates the $\lambda/8$ phase shift card in a direction parallel to the axis, each of the first end and the second end further comprises a transition configured to implement an impedance match between the $\lambda/8$ phase shift card and the second circular waveguide.

23. The waveguide device of claim 15, further including a feed horn slip joint attached to the feed horn and to the waveguide assembly, the feed horn slip joint configured to facilitate rotation, relative to one another, of the feed horn and the waveguide assembly about the axis.

24. The waveguide device of claim 15, wherein the feed horn is fixedly attached to the waveguide assembly.

25. The waveguide device of claim 15, further including a receiver associated with the first end of the waveguide assembly, the receiver configured to receive electromagnetic energy transmitted through the waveguide assembly directed from the second end to the first end.

* * * * *